(12) United States Patent
Geist

(10) Patent No.: US 10,464,449 B2
(45) Date of Patent: Nov. 5, 2019

(54) WEB MANAGEMENT SYSTEM

(71) Applicant: Indiana Mills & Manufacturing Inc, Westfield, IN (US)

(72) Inventor: Christopher Geist, Westfield, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 636 days.

(21) Appl. No.: 15/133,704

(22) Filed: Apr. 20, 2016

(65) Prior Publication Data

US 2016/0304003 A1 Oct. 20, 2016

Related U.S. Application Data

(60) Provisional application No. 62/149,720, filed on Apr. 20, 2015.

(51) Int. Cl.
*B60N 2/28* (2006.01)

(52) U.S. Cl.
CPC .... *B60N 2/2812* (2013.01); *B60N 2002/2815* (2013.01)

(58) Field of Classification Search
CPC .................................................... B60N 2/2812
USPC ........................................................ 297/484
See application file for complete search history.

(56) References Cited

U.S. PATENT DOCUMENTS

| | | | | |
|---|---|---|---|---|
| 4,688,849 A | * | 8/1987 | Tsuge | B60N 2/2812 297/256.15 |
| 5,160,186 A | * | 11/1992 | Lee | A44B 11/2549 297/476 |
| 5,899,534 A | * | 5/1999 | Gray | B60N 2/3084 297/238 |
| 2008/0054691 A1 | * | 3/2008 | Glover | B60N 2/2803 297/484 X |
| 2012/0074758 A1 | | 3/2012 | Gates et al. | |
| 2014/0070597 A1 | * | 3/2014 | Powell | B60N 2/2812 297/484 |

FOREIGN PATENT DOCUMENTS

EP    2 474 440 A2    7/2012

* cited by examiner

*Primary Examiner* — Anthony D Barfield
(74) *Attorney, Agent, or Firm* — Woodard, Emhardt, Henry, Reeves & Wagner, LLP

(57) ABSTRACT

A web management system includes a base that is configured to be secured to the seat of a vehicle. A retraction member has a first end and a second end. The first end is fixedly secured to an anchor attached to the base. The retraction member is configured to expand and retract in length between a first length and a shorter second length. The expansion and retraction are biased in favor of retraction to the second length. A web having at least a portion is fixedly secured to the base. A roller is attached to the second end of the retraction member. The roller is configured to slidably couple the web to the retraction member. Retraction of the retraction member takes up slack in the web.

19 Claims, 6 Drawing Sheets

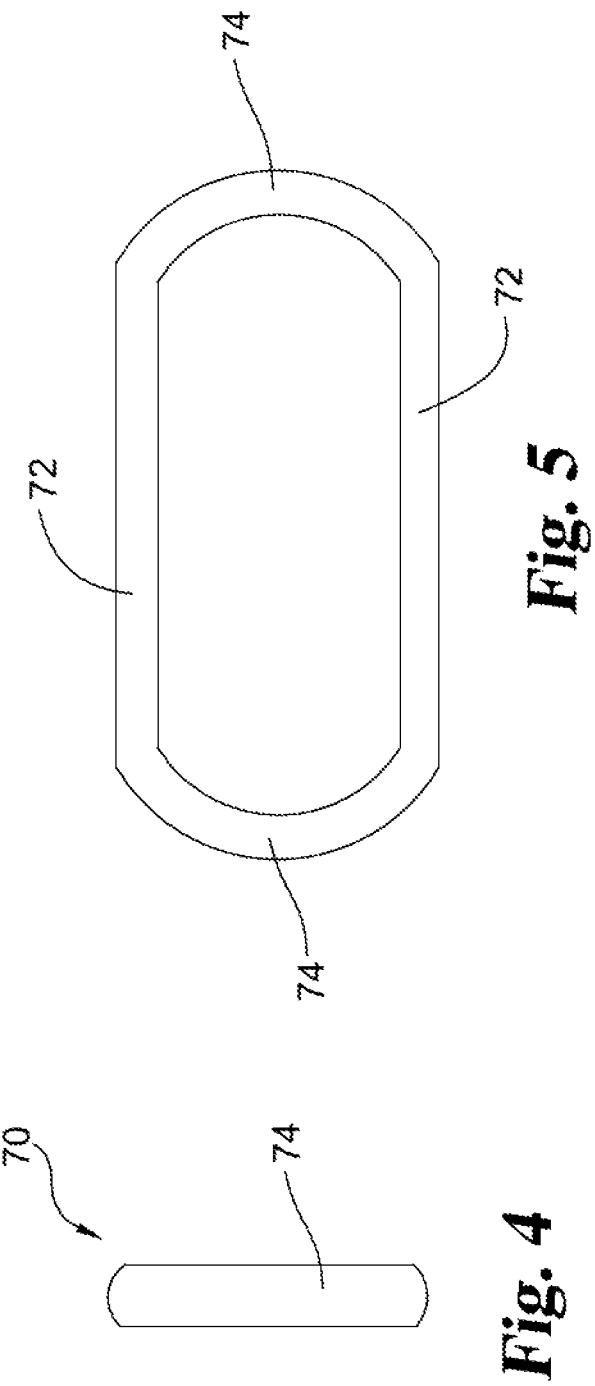

WEB MANAGEMENT SYSTEM

CROSS-REFERENCE TO RELATED APPLICATION

This application claims the benefit of U.S. Provisional Application No. 62/149,720 filed Apr. 20, 2015, which is hereby incorporated by reference.

BACKGROUND

Child safety seats may be used to safely secure a child in a vehicle. Such seats may incorporate webs or straps to secure the seat to the vehicle, and likewise the child to the seat. To accommodate different vehicle configurations and/or children of variable sizes, straps may be designed with excess length to provide adjustability. When the seat is then secured to the vehicle, and the child is secured to the seat, the straps may be adjusted to a shorter effective length for a relatively snug fit. Often, this can lead to excess tails of web that may lie loose in the vehicle, or even get in the way of mechanical attachments and other operational components of the seat. Thus, there is a need to provide a means for neatly stowing excess web while providing for repeated adjustability without manual management of excess web.

While a variety of devices and means for managing excess web have been made and used, it is believed that no one prior to the inventor(s) has made or used an invention as described herein.

SUMMARY

A first aspect concerns a web management system that includes a base configured to be secured to the seat of a vehicle. A retraction member has a first end and a second end. The first end is fixedly secured to an anchor attached to the base. The retraction member is configured to expand and retract in length between a first length and a shorter second length. The expansion and retraction are biased in favor of retraction to the second length. At least a portion of the web is fixedly secured to the base. A roller is attached to the second end of the retraction member. The roller is configured to slidably couple the web to the retraction member. Retraction of the retraction member takes up slack in the web.

Aspect 2 concerns the system of aspect 1, wherein the retraction member includes elastic material biased to retract to the second length.

Aspect 3 concerns the system of aspect 1, wherein the base includes a child safety seat.

Aspect 4 concerns the system of aspect 1, wherein the web further includes restraining straps configured to hold an occupant of the base in place, and a restraint adjustment strap looped through the roller, the restraint adjustment strap having one end connected to the restraining straps and the other end anchored to the base, wherein the retraction member is biased to move the restraint adjustment strap from an extended state to a stowed state.

Aspect 5 concerns the system of aspect 4, that includes an adjustor anchored to the base, wherein the adjustor selectively engages the restraint adjustment strap to provide restraint and adjustability.

Aspect 6 concerns the system of aspect 5, wherein the web includes a splitter plate connecting the restraining straps to the restraint adjustment strap.

Aspect 7 concerns a system that includes a child safety seat configured to secure to a vehicle. The seat defines one or more strap apertures and a plurality of restraining straps extending through the strap apertures in the seat. The restraining straps are configured to hold an occupant in the seat. Each of the restraining straps has a first end anchored to the seat and a second end extending through one of the strap apertures and a restraint adjustment strap connected to the second ends of the restraining straps. The restraint adjustment strap is configured to tighten the restraining straps when pulled from a stowed state to an extended state, and a retraction member having a first end anchored to the seat and a second end coupled to the restraint adjustment strap. The retraction member is biased to pull the restraint adjustment strap from the extended state to the stowed state.

Aspect 8 concerns the system of aspect 7, wherein the retraction member includes elastic material biased to pull the restraint adjustment strap from the extended state to the stowed state.

Aspect 9 concerns the system of aspect 8, that includes an adjustor anchored to the seat, wherein the adjustor selectively secures the restraint adjustment strap.

Aspect 10 concerns the system of aspect 9, that includes a roller attached to the retraction member, and wherein the restraint adjustment strap has a looped back section that passes through the roller and is anchored to the seat.

Aspect 11 concerns the system of aspect 10, that includes a splitter plate connecting the restraining straps to the restraint adjustment strap.

Aspect 12 concerns the system of aspect 10, wherein the roller is ring-shaped with longitudinally extending sections connected to curved sections.

Aspect 13 concerns the system of aspect 10, wherein the restraint adjustment strap extends from the adjustor and into the seat where the restraint adjustment strap passes through the roller, the restraint adjustment strap extends from the roller back towards the adjustor where the restraint adjustment strap is anchored to the seat at the adjustor.

Aspect 14 concerns the system of aspect 13, where the seat includes an anchor point and a redirection point the retraction member is anchored to the redirection point and looped around the anchor point, and the retraction member extends from the anchor point and is redirected by the redirection point towards the restraint adjustment strap.

Aspect 15 concerns the system of aspect 7, that includes a multi-point buckle coupled to the restraining straps.

Aspect 16 concerns the system of aspect 7, wherein the seat defines an internal cavity, the restraining straps extend through the strap apertures into the internal cavity of the seat, and the restraint adjustment strap is disposed inside the internal cavity.

Aspect 17 concerns a method, that includes securing an occupant in a safety seat by buckling restraining straps to the seat with a multi-point buckle, wherein the restraining straps are connected to a restraint adjustment strap that extends through an adaptor, wherein the seat includes a roller attached to a retraction member, wherein the restraint adjustment strap is looped back through the roller and is anchored to the seat at the adaptor tightening the restraining straps by pulling the restraint adjustment strap from a stowed state to an extended state, wherein the retraction member is biased to pull the restraint adjustment strap to the stowed state holding the restraining straps in a tightened state by securing the restraint adjustment strap with the adaptor, and moving the restraint adjustment strap to the stowed state with the retraction member by releasing the restraint adjustment strap.

Aspect 18 concerns the method of aspect 17, that includes securing the safety seat to a passenger seat in a vehicle.

Further forms, objects, features, aspects, benefits, advantages, and embodiments of the present invention will become apparent from a detailed description and drawings provided herewith.

BRIEF DESCRIPTION OF THE DRAWINGS

While the specification may conclude with one or more claims that particularly point out and distinctly claim the invention, it is believed the present invention will be better understood from the following description of certain examples taken in conjunction with the accompanying drawings, in which like reference numerals identify the same elements.

FIG. 4 depicts a side view of a roller of the web management system of FIG. 3A; and FIG. 5 depicts a front view of the roller of FIG. 4.

Figure 1A:
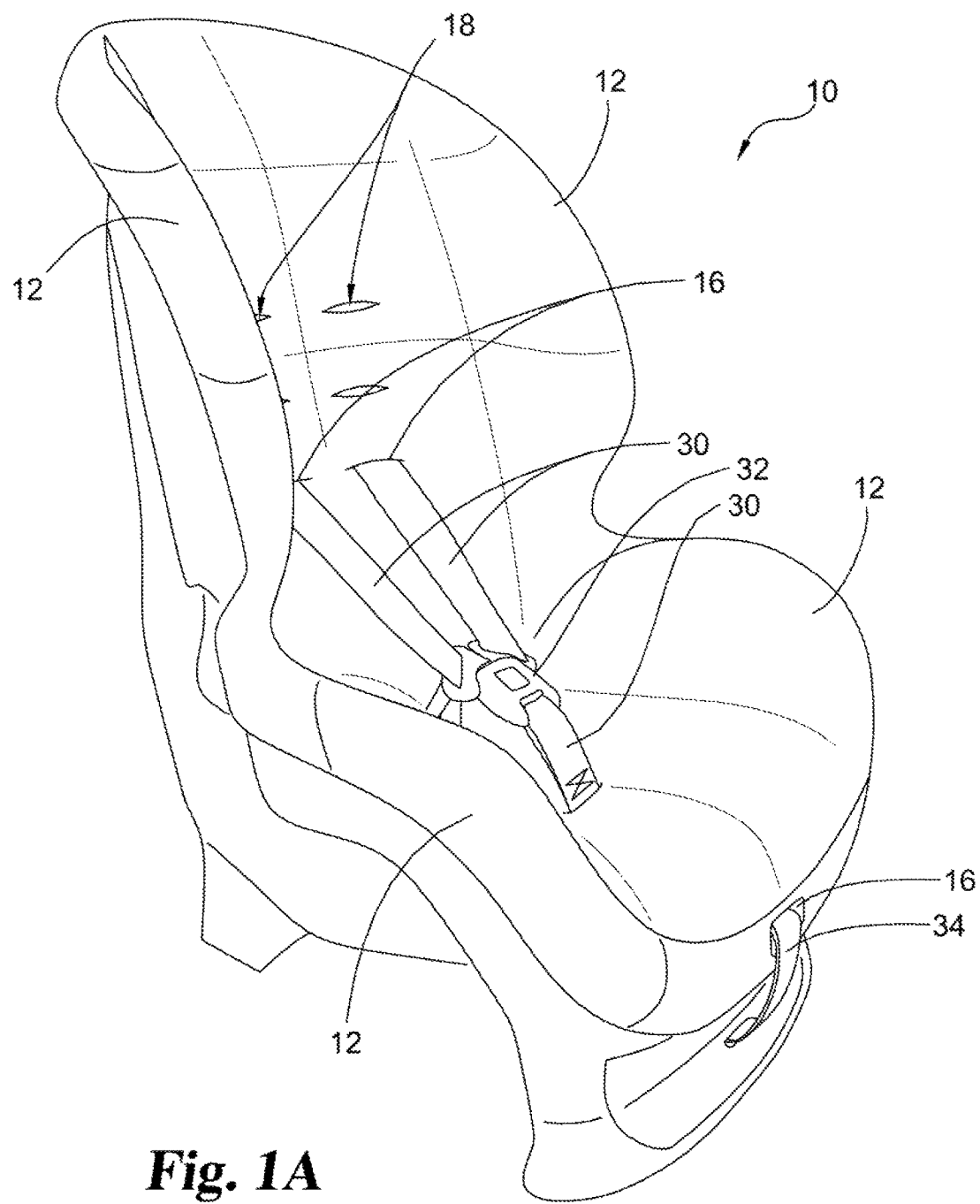
FIG. 1A depicts a perspective view of an exemplary car seat incorporating an exemplary web management system with a web in a stowed state.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DESCRIPTION OF THE SELECTED EMBODIMENTS

The following description of certain examples of the invention should not be used to limit the scope of the present invention. Other examples, features, aspects, embodiments, and advantages of the invention will become apparent to those skilled in the art from the following description. As will be realized, the invention is capable of other different and obvious aspects, all without departing from the invention. Accordingly, the drawings and descriptions should be regarded as illustrative in nature and not restrictive.

Figure 1B:
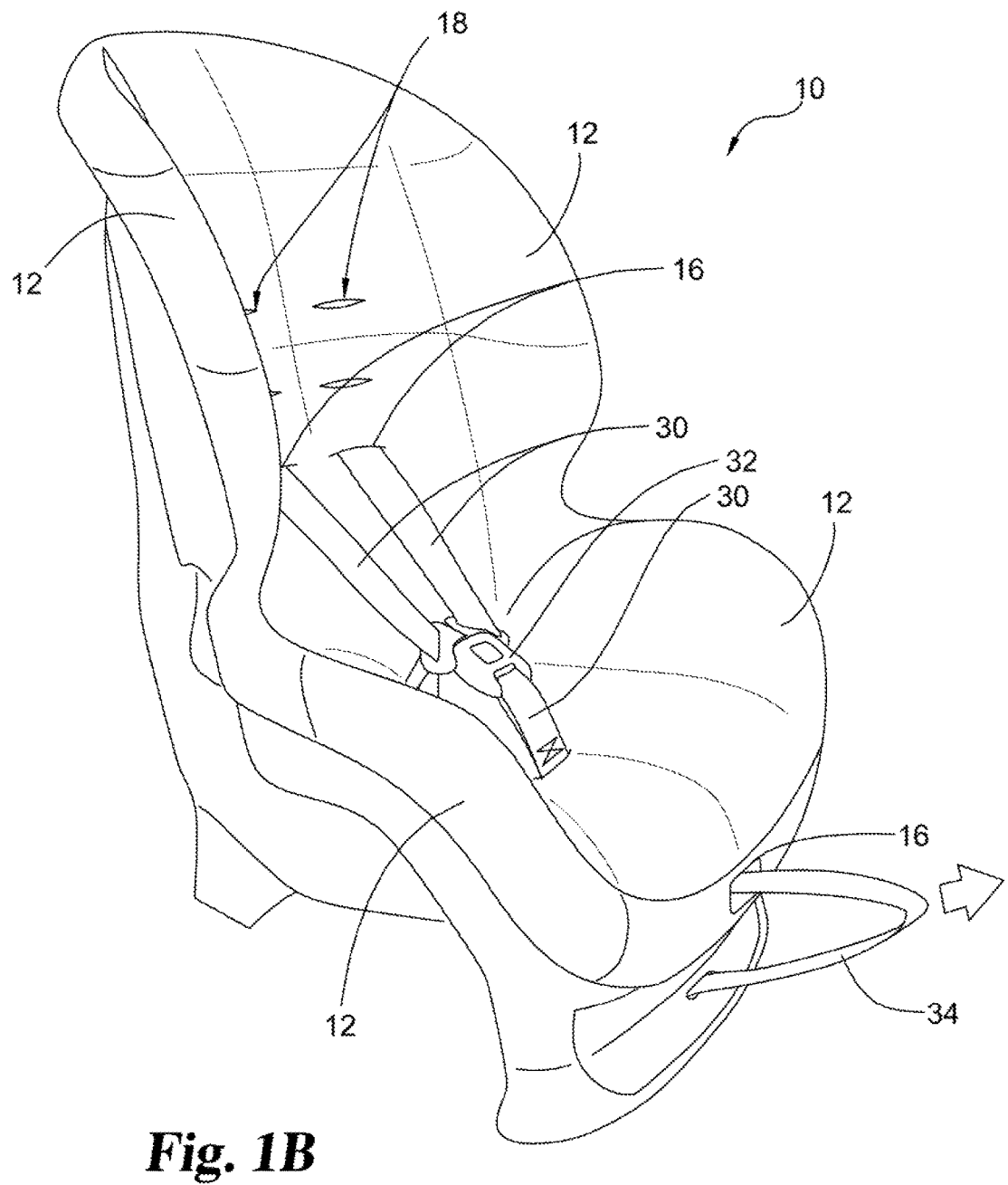
FIG. 1B depicts a perspective view of the car seat of FIG. 1A with the web in an extended state.
Figure 2:
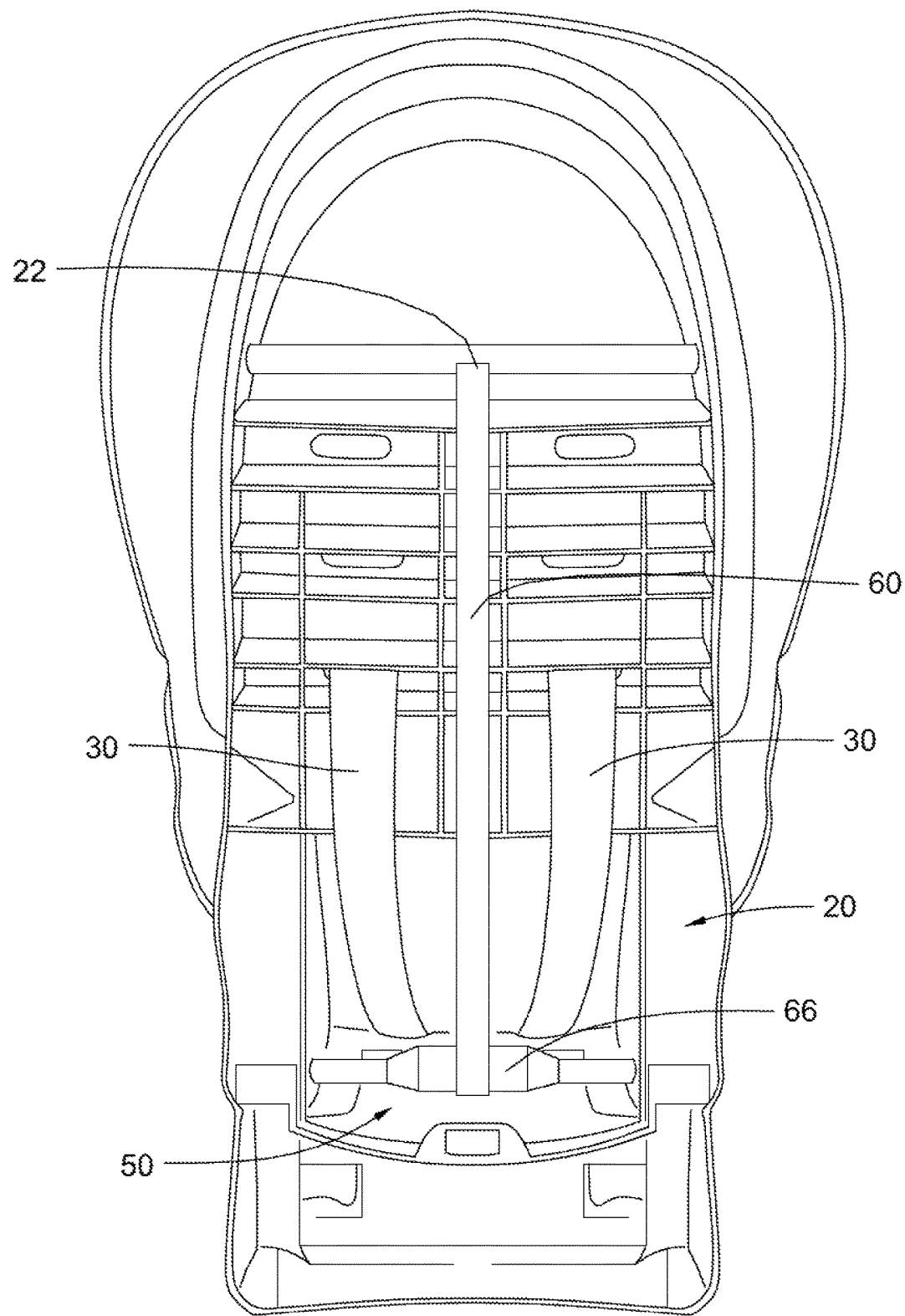
FIG. 2 depicts a back-side, cross-sectional view of the car seat of FIG. 1A.
Figure 3A:
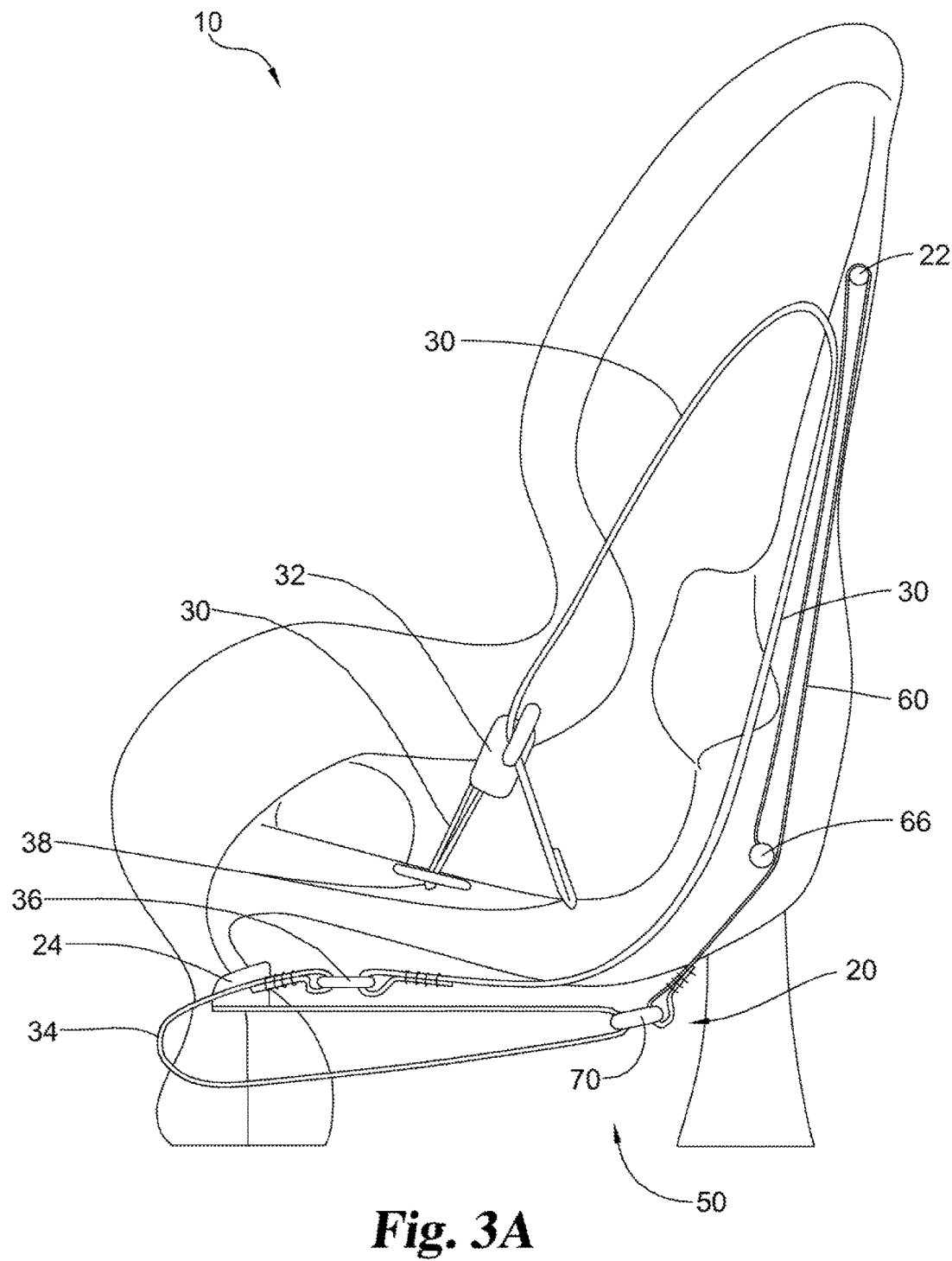
FIG. 3A depicts a side cross-sectional view of the car seat of FIG. 1, showing the web management system with the web in a stowed state.
Figure 3B:
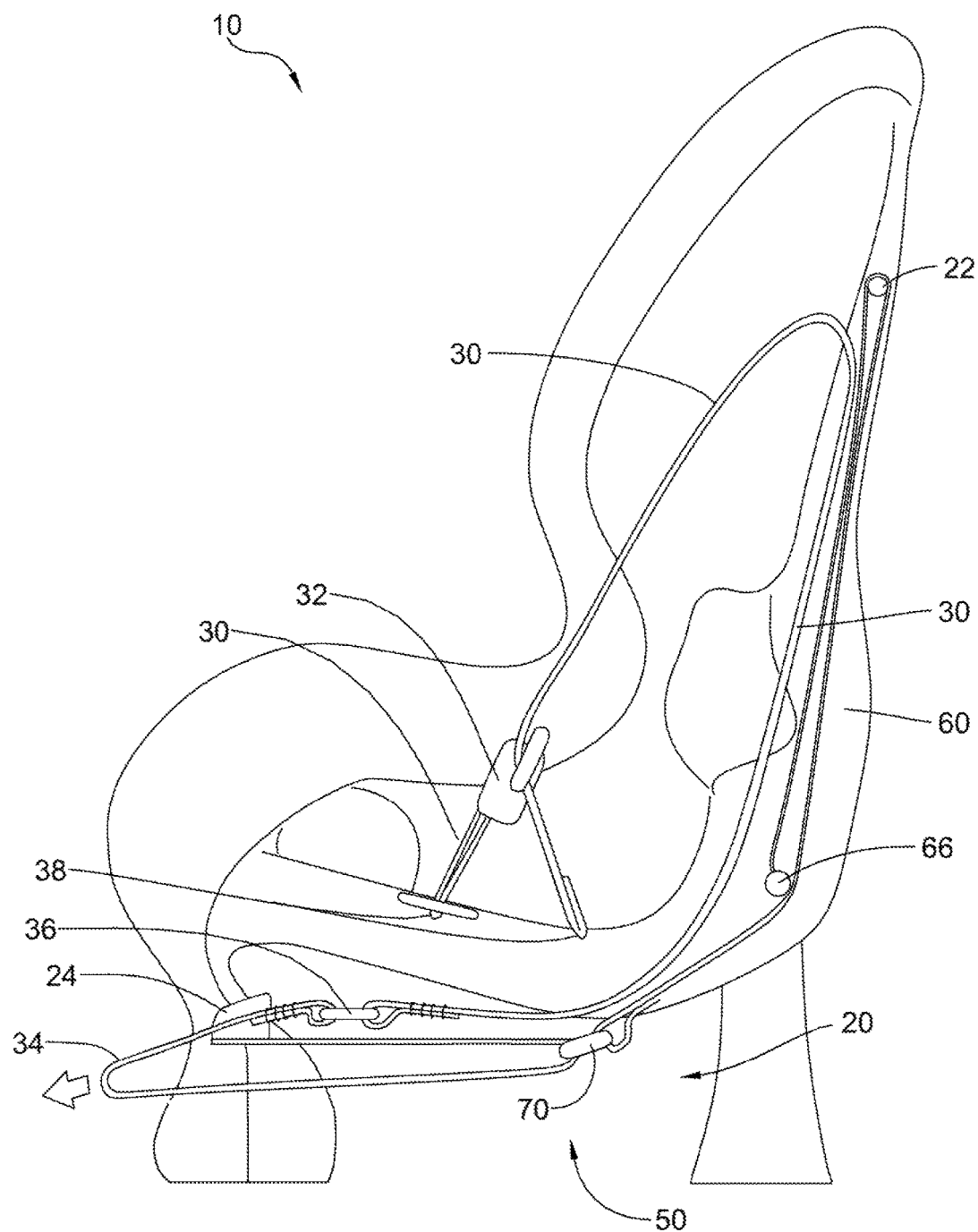
FIG. 3B depicts a side cross-sectional view of the car seat of FIG. 1, showing the web management system with the web in an extended state.

FIGS. 1A and 1B illustrate an exemplary child safety seat (10) equipped with a web management system (50, see FIGS. 2-3B). Seat (10) is shaped and sized to accommodate a child. The shape of seat (10) also may be configured for installation in a variety of vehicle seats having various sizes and configurations. Seat (10) may comprise a variety of geometric features (12) suitable to provide comfort to a child and/or aid in child safety. Seat (10) may also include a plurality of attachment features (not shown) suitable for attaching seat (10) to the seat of a vehicle using a seatbelt, external web and/or other external attachment members. In other examples, the shape, size and configuration of seat (10), as well as geometric features (12) and/or attachment features may be of any suitable configuration as may be apparent to those of ordinary skill in the art in view of the teachings herein.

In the present example, seat (10) has a rigid frame constructed of any suitable rigid material. Such rigid materials may include thermoplastics or thermosetting polymers such as acrylonitrile butadiene styrene (ABS), polyvinyl chloride (PVC), high-density polyethylene (HDPE), or the like. Other rigid materials may also include metals such as aluminum, carbon steels, or the like. Of course, any other material may be used as will be apparent to those of ordinary skill in the art in view of the teachings herein.

As can be seen, seat (10) comprises a plurality of restraining straps (30). Restraining straps (30) may comprise a woven web material similar in character to a seatbelt. By way of example only, the web of each restraining strap (30) may be woven using synthetic or natural fibers such as nylon, TEFLON, cotton, or the like. Seat (10) is configured with a plurality of lower strap apertures (16) to permit the restraining strap(s) (30) to communicate from the interior of seat (10) to the exterior of seat (10), thus maintaining at least a portion of each restraining strap (30) on the exterior of seat (10). As will be described in greater detail below, lower strap apertures (16) may permit restraining straps (30) to retract into seat (10). Seat (10) may also be equipped with a plurality of additional strap apertures (18). Although, additional strap apertures (18) are shown as not having restraining straps (30) communicating therethrough, it should be understood that restraining straps (30) may be reconfigured to communicate through additional strap apertures (18). This feature may provide additional adjustability to seat (10), thus permitting seat (10) to accommodate children of a wider variety of shapes and/or sizes, or even the same child as he or she grows.

Seat (10) provides a rigid support structure for restraining straps (30) permitting restraining straps (30) to safely secure a child to a passenger seat of a vehicle. In particular, restraining straps (30) may be extended from strap apertures (16) and wrapped around the shoulders and torso of a child, then secured to a multi-point buckle (32). Portions of restraining straps (30) remaining inside seat (10) may be anchored to seat (10). Accordingly, restraining straps (30) may hold a child in place on seat (10) while a vehicle is in motion and in the event of a collision. It should be understood that while seat (10) is shown as having a five-point restraining strap (30) system (e.g., five points of contact that secure the child), any suitable restraining strap (30) configuration may be used as will occur to those skilled in the art in view of this disclosure. Additionally, seat (10) and/or restraining straps (30) may be configured for a variety of child restraint devices. For instance, seat (10) and/or restraining straps (30) may be configured to accommodate an infant carrier instead of a child. Yet in other examples, seat (10) may be configured as a booster seat to accommodate larger and/or older children.

Seat (10) also comprises a restraint adjustment strap (34). In the present example, restraint adjustment strap (34) is substantially the same as restraining straps (30) in terms of materials and cross-sectional shape. Of course, restraint adjustment strap (34) may be comprised of different materials or have different shapes relative to restraint strap (30). In connection with an adjustor (24, discussed below in connection with FIG. 3B) restraint adjustment strap (34) may be used to tighten or loosen restraining straps (30). As can be seen in FIG. 1B, restraint adjustment strap (34) may be pulled away from the base of seat (10). As will be described in greater detail below, pulling restraint adjustment strap (34) away from the base of seat (10) may pull restraining straps (30) tight. Once restraining straps (30) have been tightened to a desired position, web management system (50) automatically retracts any excess restraint adjustment strap (34) protruding from seat (10).

FIG. 2 shows a back-side cross-sectional view of seat (10). Restraining straps (30) are shown protruding through strap apertures (16) and into an internal cavity (20) of seat (10). Restraining straps (30) extend downward toward a splitter plate (36, discussed below in connection with FIGS. 3A-3B), which connects restraining straps (30) to restraint adjustment strap (34), as will be discussed in greater detail below. FIG. 2 also shows a portion of web management system (50). In particular, a retraction member (60) is shown looped around an anchor point (22) of the seat (10) and attached to a redirection or anchor point (66). As will be described in greater detail below, from where the retraction member (60) is looped around the anchor point (22), the retraction member (60) extends downward from anchor point (22), where it passes around redirection point (66). Additionally, as will also be described in greater detail below, retraction member (60) may be configured with elastic properties. In some examples, retraction member (60) comprises woven elastic fibers made of rubber or similar fibers suitable to provide retraction member (60) with elastic properties. In other examples, retraction member (60) includes a single (non-woven) elastic material similar to a large rubber band. In yet other examples, retraction member (60) is secured to an extension spring or free-spooling web retractor, thus permitting the end of retraction member (60) opposite anchor point (22) to move relative to anchor point (22). Of course, other suitable configurations giving retraction member (60) elastic properties or similar biased mobility relative to anchor point (22) may be used and will be apparent to those of ordinary skill in the art in view of the teachings herein.

FIG. 3A shows a cross-sectional side view of seat (10) with strap (34) in a stowed state. As can be seen, seat (10) defines internal cavity (20), and which provides space for each strap (10), web management system (50), and other components. Internal cavity (20) includes a plurality of web anchor points (38) and an adjustor (24). As described above, web anchor points (38) provide rigid support for respective ends of restraining straps (30), permitting a child to be secured in seat (10). In particular, in this example, restraining straps (30) attach to web anchor points (38) and extend upwardly to multi-point buckle (32). From multi-point buckle (32), restraining straps (30) extend further upward toward strap apertures (16, see FIG. 1A). Restraining straps (30) then extend through strap apertures (16) and downwardly through internal cavity (20). Restraining straps (30) are directed by the internal geometry of seat (10) to splitter plate (36). Splitter plate (36) connects a plurality of restraining straps (30) to a single restraint adjustment strap (34). Of course, this configuration may be varied in various embodiments for different restraining strap (30) and/or seat (10) configurations as will be apparent to one of ordinary skill in the art in view of the teachings herein. Additionally, splitter plate (36) may have any of a variety of alternative configurations. For instance, splitter plate (36) may be configured to connect a single restraining strap (30) to a single restraint adjustment strap (34). Likewise, splitter plate (36) may be configured to connect a plurality of restraining straps (30) to a plurality of restraint adjustment straps (34). In yet other examples, splitter plate (36) may be omitted entirely, and restraining strap (30) and restraint adjustment strap (34) may be of an integral construction or fastened to each other by any suitable mechanical means.

Restraint adjustment strap (34) extends from splitter plate (36) and into adjustor (24). Adjustor (24) is configured to selectively engage restraint adjustment strap (34) to provide both restraint and adjustability. For instance, restraint adjustment strap (34) may be freely pulled from seat (10) to tighten restraining straps (30). However, when restraint adjustment strap (34) is pulled in the opposite direction (e.g., in the event of rapid deceleration or an accident), adjustor (24) acts as an anchor, preventing loosening of restraint adjustment strap (34). By way of example only, adjustor (24) in some embodiments comprises resiliently biased, knurled or roughened rollers that provide adjustor (24) with selective and releasable engageability of restraint adjustment strap (34). In other examples, such selective engageability may be provided by any suitable means as will be apparent to those of ordinary skill in the art in view of the teachings herein.

As described above, any length of restraint adjustment strap (34) extending from adjustor (24) may be retracted into internal cavity of seat (10) by web management system (50). In particular, restraint adjustment strap (34) extends from adjustor (24) into seat (10), where restraint adjustment strap (34) passes through a roller (70) of web management system (50). Restraint adjustment strap (34) then extends back toward adjustor (24) where it is anchored to seat (10). Thus, restraint adjustment strap (34) loops back on itself. Such a configuration permits web management system (50) to contract a certain length and thereby take up approximately twice that length as discussed below. In other examples, restraint adjustment strap (34) is configured with any suitable number of fixed or movable rollers, with a corresponding number of loopbacks, so as to stow an even greater amount of restraint adjustment strap (34) for a given contraction of retraction member (60).

Roller (70) connects one end of the loop of restraint adjustment strap (34) to retraction member (60). As can best be seen in FIGS. 4 and 5, roller (70) is generally ring-shaped with two longitudinally extending sections (72) configured to receive restraint adjustment strap (34) and retraction member (60). Longitudinally extending sections (72) are connected by two curved transverse sections (74). Longitudinally extending sections (72) are configured to permit retraction member (60) to be fixed thereto, and to permit restraint adjustment strap (34) to slide about the longitudinal axis of its respective longitudinally extending section (72). Curved transverse sections (74) hold restraint adjustment strap (34) and retraction member (60) within roller (70). In other examples, one or more of the longitudinally extending sections (72) includes a rolling feature (moving substantially freely around the longitudinally extending sections (72) of the roller (70)) to assist the slideability of restraint adjustment strap (34) about its respective longitudinally extending section (72). Of course, such a feature is merely optional and may be omitted entirely.

Roller (70) may have any other configuration suitable to fasten restraint adjustment strap (34) and retraction member (60) to one another while permitting restraint adjustment strap (34) to slide longitudinally relative to roller (70). In other examples, roller (70) may also be configured to connect a plurality of restraint adjustment straps (34) to a plurality of retraction members (60), a single restraint adjustment strap (34) to a plurality of retraction members (60), or a plurality of restraint adjustment straps (34) to a single retraction member (60). Roller (70) may also incorporate any other suitable sizes, shapes and/or configurations that may be apparent to those of ordinary skill in the art in view of the teachings herein.

FIGS. 3A and 3B show web management system (50) operating to stow excess restraint adjustment strap (34). As described above, retraction member (60) has elastic properties to resiliently bias roller (70) toward the upper rear portion of internal cavity (20) of seat (10). In particular, retraction member (60) is anchored to the redirection point (66) and looped around the anchor point (22) in the upper portion of internal cavity (20) of seat (10). Retraction member (60) then extends downwardly toward redirection point (66). Redirection point (66) permits retraction member (60) to slide about redirection point (66) as retraction member (60) contracts to its resiliently biased position. Such contraction pulls roller (70) toward redirection point (66) and toward the upper rear portion of internal cavity (20) of seat (10). This motion takes up the slack in restraint adjustment strap (34). Restraint adjustment strap (34) freely slides through roller (70), thus expanding the loop formed in restraint adjustment strap (34) and pulling any excess restraint adjustment strap (34) into internal cavity (20) of seat (10).

Although restraint adjustment strap (34) is shown as being stowed by web management system (50), it should be understood that web management system (50) may be used with any other strap and/or web, such as top tether straps and/or LATCH straps. Additionally, various forms of web management system (50) may be incorporated into other child restraint systems, such as those for infant carriers or booster seats incorporating tethering. Of course, web management system (50) may be used with any other strap configuration and/or child restraint system as will be apparent to those of ordinary skill in the art in view of the teachings herein. In some of these examples, the handle could even be added so that the user can manually assist retraction of retraction member (60).

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of the structure and operation show and described in the specification and drawings.

The invention claimed is:

1. A system, comprising:
   a child safety seat configured to secure to a vehicle, wherein the seat defines one or more strap apertures;
   a plurality of restraining straps extending through the strap apertures in the seat, wherein the restraining straps are configured to hold an occupant in the seat, wherein each of the restraining straps has a first end anchored to the seat and a second end extending through one of the strap apertures;
   a restraint adjustment strap connected to the second ends of the restraining straps, wherein the restraint adjustment strap is configured to tighten the restraining straps when pulled from a stowed state to an extended state; and
   a retraction member having a first end anchored to the seat and a second end coupled to the restraint adjustment strap, wherein the retraction member is made of an elastic material that stretches to a first length and retracts to a second length that is shorter than the first length, wherein the retraction member is biased to retract from the first length to the second length to pull the restraint adjustment strap from the extended state to the stowed state.

2. The system of claim 1, wherein the retraction member includes elastic material biased to pull the restraint adjustment strap from the extended state to the stowed state.

3. The system of claim 2, further comprising:
   an adjustor anchored to the seat, wherein the adjustor selectively secures the restraint adjustment strap.

4. The system of claim 3, further comprising:
   a roller attached to the retraction member; and
   wherein the restraint adjustment strap has a looped back section that passes through the roller and is anchored to the seat.

5. The system of claim 4, further comprising:
   a splitter plate connecting the restraining straps to the restraint adjustment strap.

6. The system of claim 4, wherein the roller is ring-shaped with longitudinally extending sections connected to curved sections.

7. The system of claim 4, wherein the restraint adjustment strap extends from the adjustor and into the seat where the restraint adjustment strap passes through the roller, the restraint adjustment strap extends from the roller back towards the adjustor where the restraint adjustment strap is anchored to the seat at the adjustor.

8. The system of claim 7, where:
   the seat includes an anchor point and a redirection point;
   the retraction member is anchored to the redirection point and looped around the anchor point; and
   the retraction member extends from the anchor point and is redirected by the redirection point towards the restraint adjustment strap.

9. The system of claim 1, further comprising:
   a multi-point buckle coupled to the restraining straps.

10. The system of claim 1, wherein:
    the seat defines an internal cavity;
    the restraining straps extend through the strap apertures into the internal cavity of the seat; and
    the restraint adjustment strap is disposed inside the internal cavity.

11. A method, comprising:
    securing an occupant in a safety seat by buckling restraining straps to the seat with a multi-point buckle, wherein the restraining straps are connected to a restraint adjustment strap that extends through an adaptor, wherein the seat includes a roller attached to a retraction member, wherein the restraint adjustment strap is looped back through the roller and is anchored to the seat at the adaptor;
    tightening the restraining straps by pulling the restraint adjustment strap from a stowed state to an extended state, wherein the retraction member is biased to pull the restraint adjustment strap to the stowed state, wherein the retraction member is an elastic strap that stretches to a first length and retracts to a second length that is shorter than the first length, wherein said tightening includes stretching the retraction member from the second length to at least the first length;

holding the restraining straps in a tightened state by securing the restraint adjustment strap with the adaptor; and moving the restraint adjustment strap to the stowed state with the retraction member by releasing the restraint adjustment strap, wherein said moving includes shrinking the retraction member from the first length to the second length to pull the restraint adjustment strap to the stowed state.

12. The method of claim 11, further comprising:

securing the safety seat to a passenger seat in a vehicle.

13. A system, comprising:
a child safety seat configured to secure to a vehicle, wherein the seat defines one or more strap apertures;
a plurality of restraining straps extending through the strap apertures in the seat, wherein the restraining straps are configured to hold an occupant in the seat, wherein each of the restraining straps has a first end anchored to the seat and a second end extending through one of the strap apertures;
a restraint adjustment strap connected to the second ends of the restraining straps, wherein the restraint adjustment strap is configured to tighten the restraining straps when pulled from a stowed state to an extended state;
a retraction member having a first end anchored to the seat and a second end coupled to the restraint adjustment strap, wherein the retraction member is biased to pull the restraint adjustment strap from the extended state to the stowed state;
wherein the retraction member includes elastic material biased to pull the restraint adjustment strap from the extended state to the stowed state;
an adjustor anchored to the seat, wherein the adjustor selectively secures the restraint adjustment strap;
a roller attached to the retraction member; and
wherein the restraint adjustment strap has a looped back section that passes through the roller and is anchored to the seat.

14. The system of claim 13, further comprising:
a splitter plate connecting the restraining straps to the restraint adjustment strap.

15. The system of claim 13, wherein the roller is ring-shaped with longitudinally extending sections connected to curved sections.

16. The system of claim 13, wherein the restraint adjustment strap extends from the adjustor and into the seat where the restraint adjustment strap passes through the roller, the restraint adjustment strap extends from the roller back towards the adjustor where the restraint adjustment strap is anchored to the seat at the adjustor.

17. The system of claim 16, where:
the seat includes an anchor point and a redirection point;
the retraction member is anchored to the redirection point and looped around the anchor point; and
the retraction member extends from the anchor point and is redirected by the redirection point towards the restraint adjustment strap.

18. The system of claim 13, further comprising:
a multi-point buckle coupled to the restraining straps.

19. The system of claim 13, wherein:
the seat defines an internal cavity;
the restraining straps extend through the strap apertures into the internal cavity of the seat; and
the restraint adjustment strap is disposed inside the internal cavity.

* * * * *